Patented Nov. 17, 1931

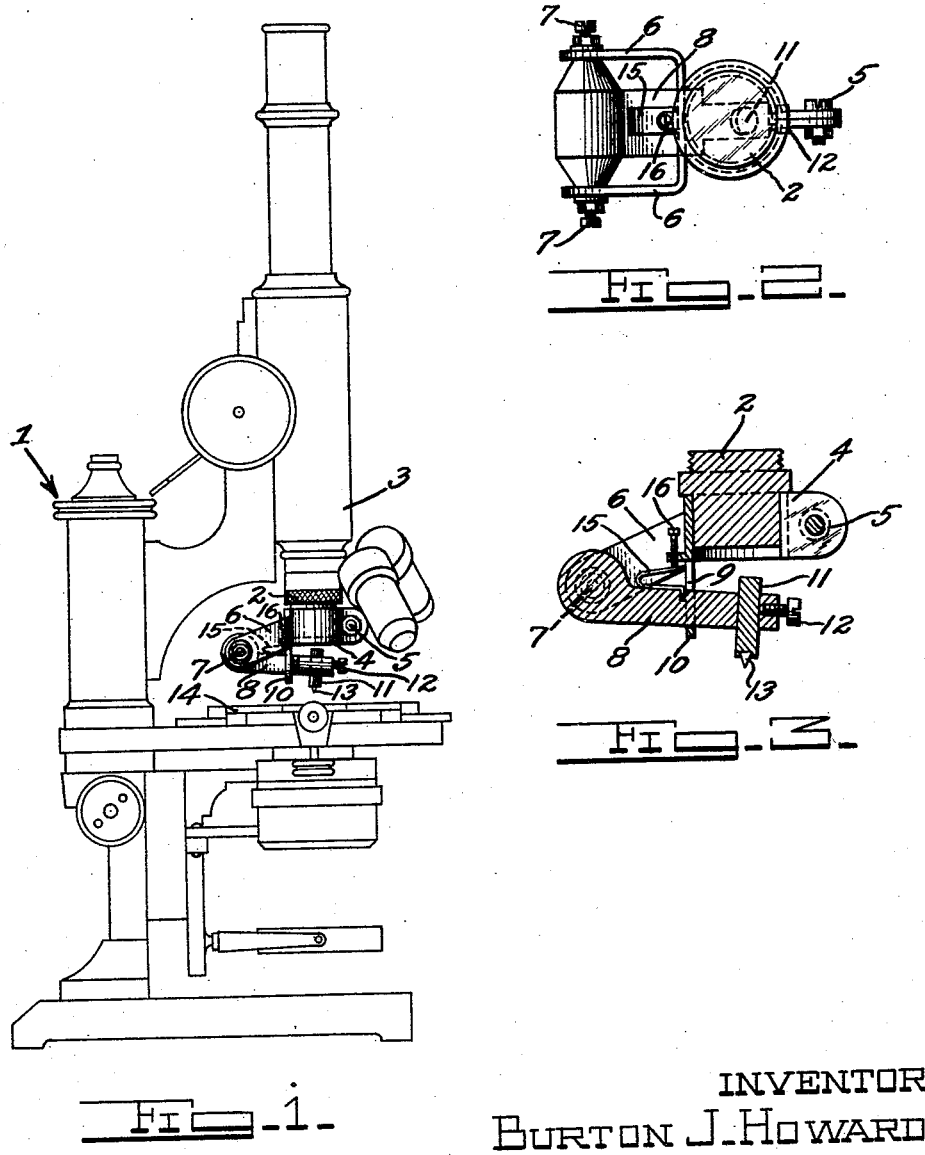

1,832,124

UNITED STATES PATENT OFFICE

BURTON J. HOWARD, OF WASHINGTON, DISTRICT OF COLUMBIA, DEDICATED, BY ASSIGNMENT, TO THE FREE USE OF THE GOVERNMENT AND THE PUBLIC

RULING APPARATUS

Application filed December 4, 1930. Serial No. 500,132.

(GRANTED UNDER THE ACT OF MARCH 3, 1883, AS AMENDED APRIL 30, 1928; 370 O. G. 757)

This application is made under the act approved March 3, 1883, as amended by the act of April 30, 1928, and the invention herein described may be manufactured and used by or for the Government for governmental purposes without the payment to me of any royalty thereon.

I hereby dedicate the invention herein described to the free use of the public, to take effect upon the granting of a patent to me.

My invention relates to a ruling apparatus for glass or other flat surfaces attachable to a microscope having a mechanical stage. In using microscopes and various other pieces of physical apparatus it is frequently desirable to employ discs or slides ruled with fine lines. In the conduct of a laboratory it is often highly desirable to be able to produce such ruled apparatus on short notice. The device hereinafter described has been designed with the object of enabling the laboratory worker, who has access to a suitable microscope, to effect such rulings expeditiously without undue expense and delay, and with such degree of accuracy as to make them of practical use for certain kinds of experimental and routine work.

In the accompanying drawings Fig. 1 is a side elevation of the apparatus attached to a miscroscope; Fig. 2 is a top plan view of the apparatus detached from the microscope, and Fig. 3 is a longitudinal section view of the apparatus detached from the microscope.

Similar numerals refer to similar parts throughout the views.

This apparatus is fitted with a short metal post (2) furnished with a society screw by which it is attached to the tube of the compound microscope (3) in place of an objective, as shown in Fig. 1. Encircling the lower portion of the post is a collar (4) held snugly in place by friction by means of a small bolt and nut (5) by which the tightness can be adjusted. The collar bears two arms (6, 6) to which is pivoted by needle points and set screws (7) an arm (8) which extends through a slot (9) in an extension (10) formed integral with the supporting collar (4), to somewhat beyond the optical center of the microscope. Near the free-end of the pivoted arm (8) is a cylindrical hole in which is inserted a small vertical adjustable post (11) held in place by a suitable set-screw (12). To the lower end of this post is attached by suitable means a small, sharp diamond chip or other suitable cutting point (13). The setting of the diamond point must be tested and the post adjusted till the point will give a suitable sharp line when in use.

In order to use the instrument, it is screwed on to the lower end of the tube of a microscope in place of an objective. The microscope stage should be furnished with an accurately adjusted mechanical stage (14) with vernier scales.

The slide to be ruled is placed on the mechanical stage (14) and the microscope tube lowered till the diamond point rests on the slide. By means of the mechanical stage the slide is drawn along under the diamond point. When the line has been ruled for the distance desired, the microscope tube is raised sufficiently to lift the diamond point out of contact with the slide. The slide is then moved back to the starting point. By observing the vernier scale, the slide is then moved over at right angles accurately into position for the second line. The diamond point is again lowered into contact with the slide and the second line ruled. This procedure is repeated till the required lines have been ruled. If it is desired to rule a second set of lines at right angles to the first set, the friction collar is revolved 90° on the supporting post and the second set of lines ruled.

When it is desired to make the rulings on a small disc, the latter is first attached to an ordinary microscope slide by means of a bit of paraffin or other suitable wax. The slide bearing the disc is then placed in position on the mechanical stage and the ruling proceeded with as described above.

In ruling the lines it is necessary that the slide by moved parallel to the length of the pivoted arm (8). In case it is found that the weight of the pivoted arm is not sufficient to cut as deep lines as are desired, the pressure can be increased by inserting a U-shaped spring (15) in between the arm (8) and the upper edge of the slot (9) and adjusting till the required pressure is secured. If desired, the degree of pressure can be accurately adjusted by means of a regulating screw (16) in contact with the upper wing of the spring.

I claim:

1. The combination with a microscope having a mechanical stage with vernier scales, of a device capable of being attached to a microscope for the purpose of ruling fine lines comprising a metal post having a society screw, a collar removably attached and encircling the lower portion of said post, two parallel arms extending from such collar, an arm pivotally fastened to the free ends of said parallel arms, a sharp diamond chip and means for attaching the diamond chip to said pivoted arm.

2. A ruling apparatus capable of being attached to a microscope having a mechanical stage and vernier scales, for the purpose of ruling fine lines, comprising a metal post having a society screw, a collar removably attached and encircling the lower portion of said post, two parallel arms extending from such collar, an arm pivotally fastened to the free ends of said parallel arms; a sharp diamond chip and means for attaching the diamond chip to said pivoted arm.

BURTON J. HOWARD.